(12) United States Patent
Li (10) Patent No.: US 9,647,709 B1
(45) Date of Patent: May 9, 2017

(54) CONVERTIBLE DATA CARRIER CRADLE FOR ELECTRONIC MOBILE DEVICE

(71) Applicant: Giesecke & Devrient Mobile Security America, Inc., Dulles, VA (US)

(72) Inventor: Yongjia Li, Ashburn, VA (US)

(73) Assignee: Giesecke & Devrient Mobile Security America, Inc., Dulles, VA (US)

( * ) Notice: Subject to any disclaimer, the term of this patent is extended or adjusted under 35 U.S.C. 154(b) by 0 days.

(21) Appl. No.: 15/236,772

(22) Filed: Aug. 15, 2016

(51) Int. Cl.
| | |
|---|---|
| H04B 1/38 | (2015.01) |
| H04M 1/00 | (2006.01) |
| G08B 13/14 | (2006.01) |
| H04B 1/3816 | (2015.01) |

(52) U.S. Cl.
CPC .................. *H04B 1/3816* (2013.01)

(58) Field of Classification Search
CPC ...... H04B 1/18; H04B 1/3816; H04B 1/3883; H04M 1/00; H04M 1/0262; H04M 1/0214; G08B 13/14; H01Q 1/243; H01Q 7/00; H01Q 1/242; G06K 19/07773
See application file for complete search history.

(56) References Cited

U.S. PATENT DOCUMENTS

| | | | | |
|---|---|---|---|---|
| 6,923,373 B2 * | 8/2005 | Kanagawa | ............. | G06K 13/08 235/441 |
| 7,445,476 B2 * | 11/2008 | Ujii | ..................... | G06K 19/077 439/159 |
| 7,597,566 B2 * | 10/2009 | Peiker | .................... | G06K 13/08 439/131 |
| 7,734,279 B2 * | 6/2010 | Fantini | ................ | H04L 63/0853 370/230 |
| 8,150,466 B2 * | 4/2012 | Park | ...................... | G06K 7/0021 361/600 |
| 8,382,059 B2 | 2/2013 | Le Gette et al. | | |
| 8,968,029 B2 * | 3/2015 | Yun | ...................... | H01R 12/714 439/159 |
| 9,002,421 B2 * | 4/2015 | Choi | .................... | H04B 1/3816 455/41.1 |
| 9,267,638 B2 | 2/2016 | Le Gette et al. | | |
| 2010/0267419 A1 * | 10/2010 | Nishizawa | .......... | G06K 7/0021 455/558 |
| 2010/0304758 A1 * | 12/2010 | Bury | ...................... | G01S 19/35 455/456.1 |
| 2014/0199875 A1 * | 7/2014 | Choi | .................... | H04B 1/3816 439/346 |
| 2015/0190648 A1 * | 7/2015 | Fischell | ................. | A61N 2/006 600/14 |

* cited by examiner

*Primary Examiner* — Pablo Tran
(74) *Attorney, Agent, or Firm* — Drinker Biddle & Reath LLP (57) ABSTRACT

A data carrier including a SIM card may be converted into a cradle to support a mobile communications device after the SIM card is removed and inserted into the device. The card body includes first, second, and third manipulation lines extending across the card body. The card body may be manipulated about these manipulation lines to form a stand and cradle comprising a first support portion to support a rear surface of the mobile communications device, a second support portion mobile to support a side surface of the mobile communications device, and a lip portion that secures the mobile communications device within the cradle. The lip portion is shorter in length than either the first or second support portions to limit obstruction of a display for the mobile communications device when disposed within the cradle to facilitate viewing of the display.

19 Claims, 9 Drawing Sheets

FIG. 5

US 9,647,709 B1

CONVERTIBLE DATA CARRIER CRADLE FOR ELECTRONIC MOBILE DEVICE

TECHNICAL FIELD

The present disclosure relates generally to a data carrier that is convertible for use as a cradle or holder for an electronic device, such as a smartphone.

BACKGROUND

Contemporary mobile electronic communication devices, such as smartphones or feature phones, permit users to communicate with a service provider over a network. These mobile communication devices are often equipped with a module card that includes an integrated circuit, such as a subscriber identity module (SIM) or a universal integrated circuit card (UICC), held on a removable card commonly referred to as a SIM card. These SIM cards can be transferred between different mobile communications devices, such as smartphones or feature phones. A SIM card may include a unique Integrated Circuit Card Identifier ("IC-CID"), International Mobile Subscriber Identity (IMSI) number, and other security features that are used to identify and authenticate subscribers and their mobile communications devices on wireless communication networks.

Figure 1:
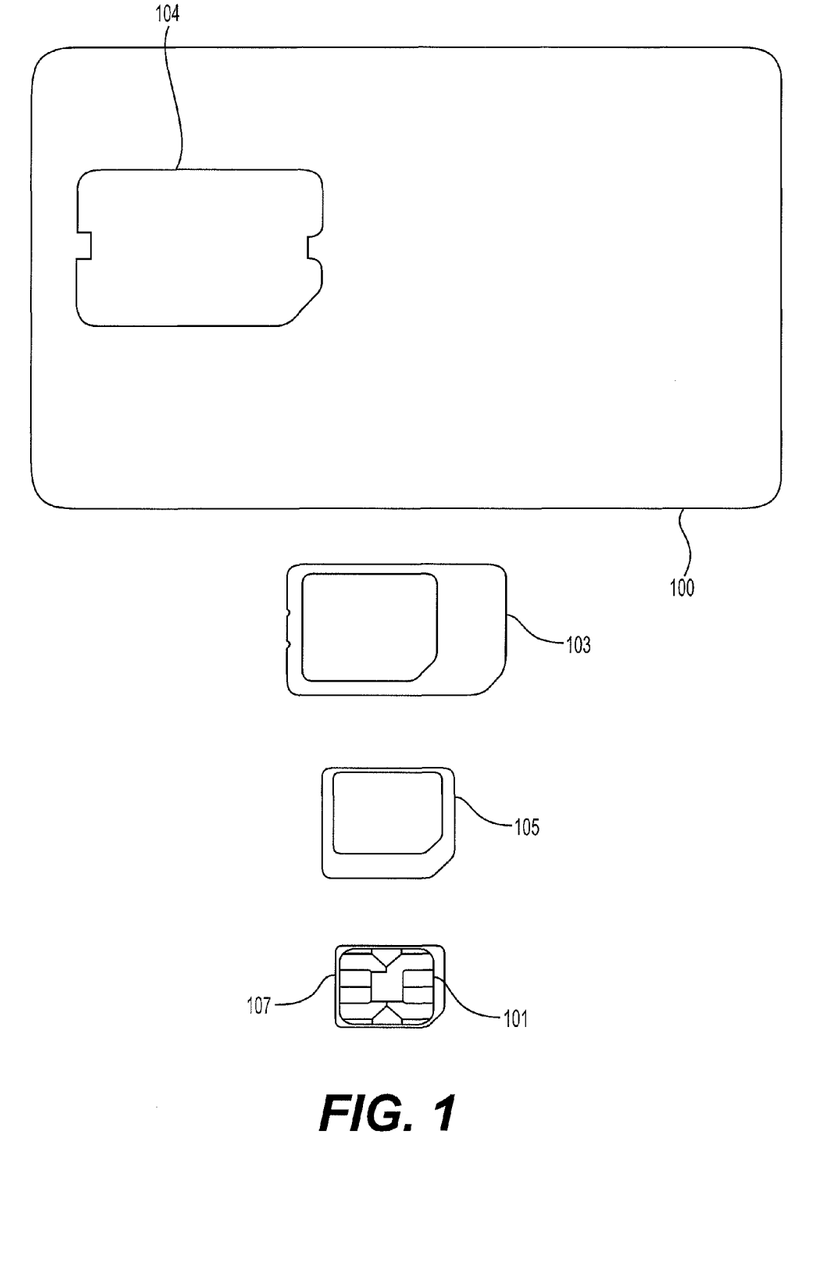
FIG. 1 is a plan view of a ID-1 Format data carrier for a SIM and cutouts corresponding to different form factors.

The original full-size SIM cards (1FF) were the same size as a credit card (ID-1 format: 85.60 mm×53.98 mm×0.76 mm). Over time as mobile communications devices became more advanced, SIM cards were reduced in size to mini-SIM (2FF), micro-SIM (3FF), and even nano-SIM form (4FF) factors, for example. As shown in FIG. 1, the electrical contact 101 of the SIM for each of these SIM card form factors is the same, and thus these smaller SIM card form factors often come embedded in a full size (1FF) ID-1 Format data carrier 100 made of plastic, which includes templates for each form factor 103 (2FF), 105 (3FF), 107 (4FF). In FIG. 1, all of the templates are shown removed from data carrier 100 such that a nano-SIM card comprising form factor 107 and electrical contact 101 for a SIM or UICC is provided. After the desired form factor SIM card is removed from a cutout 104 of data carrier 100 and inserted into a particular mobile communications device, it becomes waste. The flexibility of SIM card is desired by users and wireless service providers, especially in view of the rise of prepaid wireless segment in which users provide their own devices. Given the billions of users of mobile communications devices, it is desirable to reduce this waste by providing an alternative function for the leftover ID-1 format data carriers.

One such alternative function is that the data carrier may be converted into a cradle for holding a mobile communications device. Such an application is particularly useful where the mobile communications device is a smartphone that can be used for viewing video. One example of such a device is depicted in U.S. Pat. No. 9,267,638, which includes a form fitting backplate that approximates the size and shape of the electronic device and includes a separate stand member to hold the device in an upright position for viewing video. With the basic form of the ID-1 Format data carrier, however, the size of the card is fixed and there is no structure for a separate stand member. It would be advantageous to provide a mechanism and a method for converting the basic structure of the ID-1 Format data carrier of a fixed size into a cradle for a specific type of mobile communications device.

SUMMARY OF THE INVENTION

According to aspects of the present disclosure, a data carrier is configured for conversion into a cradle for supporting configured to support a mobile communications device. The carrier includes a card body having comprising a first end and a second end along a particular direction and a first side and a second side along a further direction. The card body includes a cutout; a first manipulation line extending along the further direction at a particular position of the card body at or beyond an end of the cutout opposite the first end, the first manipulation line defining a stand portion extending from the first end to the first manipulation line; a second manipulation line extending along the further direction of the card body downstream of the first manipulation line relative to the first end in the particular direction, the second manipulation line defining a first support portion extending from the first manipulation line to the second manipulation line; a third manipulation line extending along the further direction of the card body downstream of the second manipulation line relative to the first end in the particular direction, the third manipulation line defining a second support portion extending from the second manipulation line to the third manipulation line such that a length of the second support portion is less than a length of the first support portion; and a lip portion defined by the third manipulation line and the second end, a length of the lip portion is less than the length of the second support portion; and a removable SIM card disposed within the cutout, the removable SIM card connected to the card body by at least one fixing portion. The card body is configured to be manipulated about the first manipulation line to form a stand such that an end of the stand portion proximate the first manipulation line is elevated relative to the first end of the card body. The card body is further configured to be manipulated about the second manipulation line so that the first support portion is configured to support a rear surface of the mobile communications device and the second support portion is configured to support a side surface of the mobile communications device. The card body is also configured to be manipulated about the third manipulation line so that the lip portion is configured to secure a mobile communications device that is sitting within the cradle formed by the first support portion, the second support portion, and the lip portion.

According to other aspects of the present disclosure, there is a method of forming a cradle for supporting a mobile communications device from a data carrier including a card body. The method includes providing the card body having a first end and a second end along a particular direction and a first side and a second side along a further direction. The card body also includes a cutout; a first manipulation line extending along the further direction at a particular position of the card body at or beyond an end of the cutout opposite the first end, the first manipulation line defining a stand portion extending from the first end to the first manipulation line; a second manipulation line extending along the further direction of the card body downstream of the first manipulation line relative to the first end in the particular direction, the second manipulation line defining a first support portion extending from the first manipulation line to the second manipulation line; a third manipulation line extending along the further direction of the card body downstream of the second manipulation line relative to the first end in the particular direction, the third manipulation line defining a second support portion extending from the second manipulation line to the third manipulation line such that a length of the second support portion is less than a length of the first support portion; and a lip portion defined by the third manipulation line and the second end, a length of the lip portion is less than the length of the second support portion. The card body is manipulated about the first manipulation line to form a stand such that an end of the stand portion proximate the first manipulation line is elevated relative to the first end of the card body. The card body is manipulated about the second manipulation line so that the first support portion is configured to support a rear surface of the mobile communications device and the second support portion is configured to support a side surface of the mobile communications device. The card body is manipulated about the third manipulation line so that the lip portion secures a mobile communications device that is sitting within the cradle formed by the first support portion, the second support portion, and the lip portion.

By providing a data carrier that may be converted into a cradle for the mobile communication device it was provided with, the amount of waste is greatly reduced since the data carrier may be repurposed. Other objects, features, and advantages will be apparent to persons of ordinary skill in the art from the following detailed description and the accompanying drawings.

BRIEF DESCRIPTION OF THE DRAWINGS

For a more complete understanding of the present invention, needs satisfied thereby, and the objects, features, and advantages thereof, reference now is made to the following description taken in connection with the accompanying drawings.

DETAILED DESCRIPTION OF THE INVENTION

The popularity of mobile communication devices, such as smartphones, has exploded in part because such devices can be used as portable video players capable of showing high definition video. Such smartphone devices are also used for voice and data transmissions over wireless communication networks. Over the last 25 years, authentication of such devices on wireless communication networks is performed using SIMs and UICCs (collectively, "SIMs"). As noted above, original SIMs (1FF) were the size of a credit card but contemporary mobile communication devices use smaller SIM card formats such as the mini-SIM (2FF), micro-sim (3FF), and nano-SIM (4FF). SIMs are backward compatible and are often provided embedded on a full size (IFF) data carrier with one or more cutouts so that the SIM card may be configured to the correct form factor for a particular mobile device.

Figure 2A:
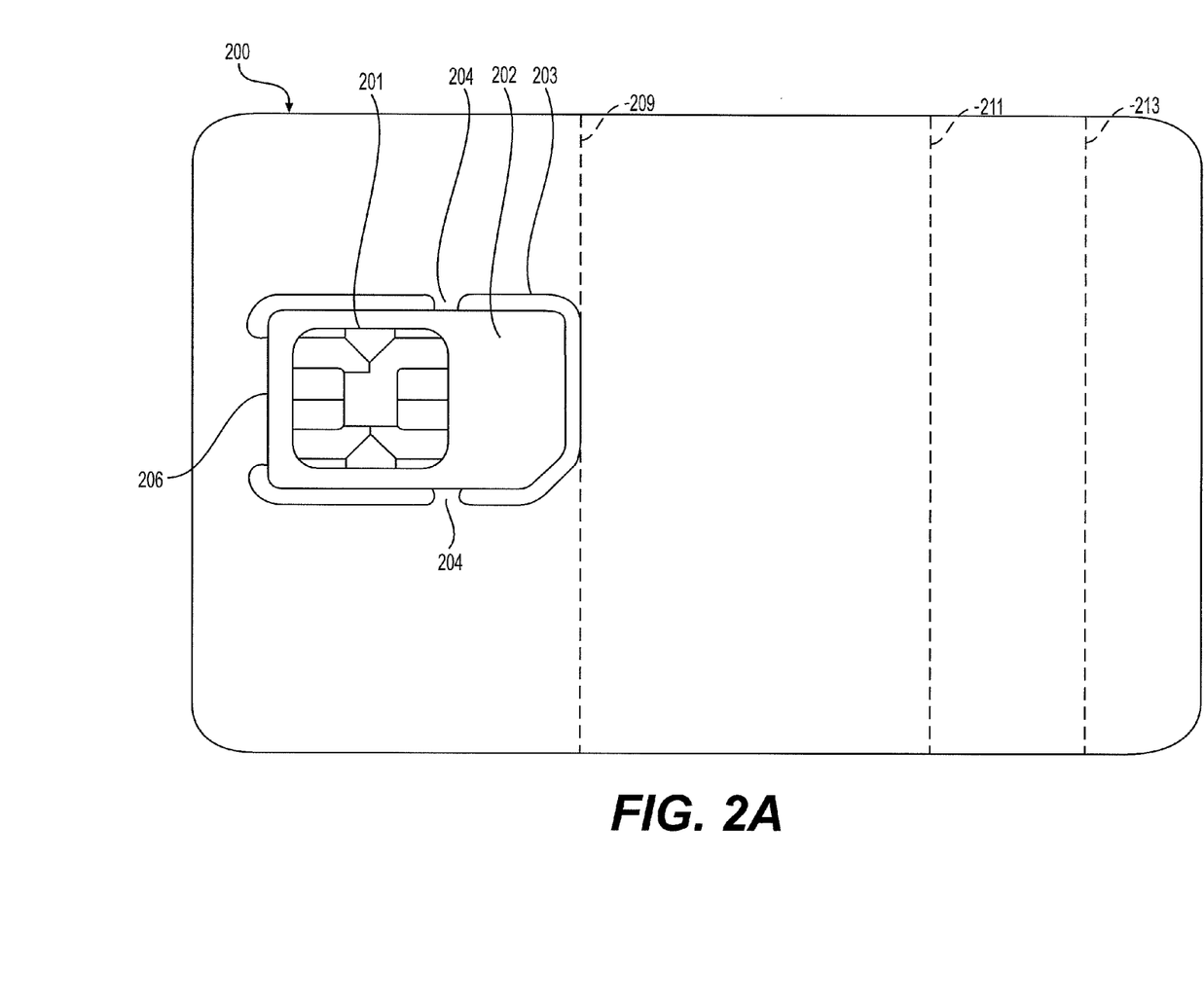
FIG. 2A is a plan view of an ID-1 Format data carrier with an embedded SIM according to an embodiment of the invention.

FIG. 2A illustrates an exemplary embodiment of the invention showing a mini-SIM card 202 having an electrical contact 201 (for either a SIM or UICC) embedded in a card body 200 for a full-size ID-1 Format data carrier. This arrangement is also known as an ID-1/000 Format. Mini-SIM card 202 may be easily removed from cutout 203 of card body 200 using breakable fixing portions 204, 206 that secure SIM card 202 to card body 200. Card body 202 and fixing portions 204, 206 are made of a flexible material so that SIM card 202 is easily bendable from a plane of card body 200 for removal and insertion into a mobile communications device. A mini-SIM (2FF) is shown for exemplary purposes but any reduced-size SIM card form factor is suitable for the invention, such as those shown in FIG. 1 or any future SIM card form factor.

Figure 2B:
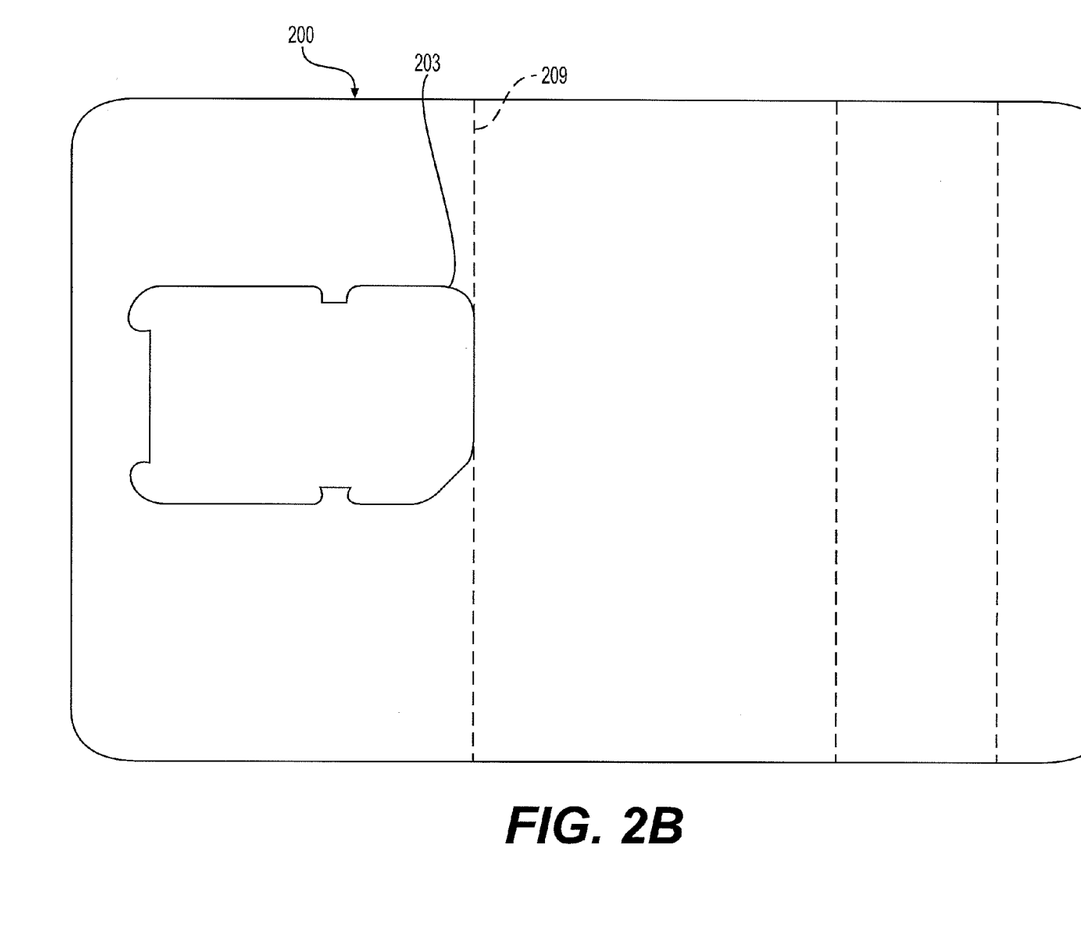
FIG. 2B is a plan view of the data carrier of FIG. 2A with the SIM removed.

Card body 200 may also include a number of pre-formed manipulation lines such as perforations 209, 211, 213, at specific portions of card body 200 configured to permit manipulation of card body 200, such as by bending about the perforations, in order to form a cradle for a mobile communications device. Perforation 209 may be aligned with an end of cutout 203 (or further downstream from cutout 203) such that perforation 209 does not align with cutout 203 where card body 200 can be manipulated by bending along perforation 209. Such an arrangement may facilitate production of card body 200 so that providing perforation 209 will not interfere with SIM card 202. FIG. 2B illustrates card body 200 after removal of SIM card 202 from cutout 203.

Figure 3A:
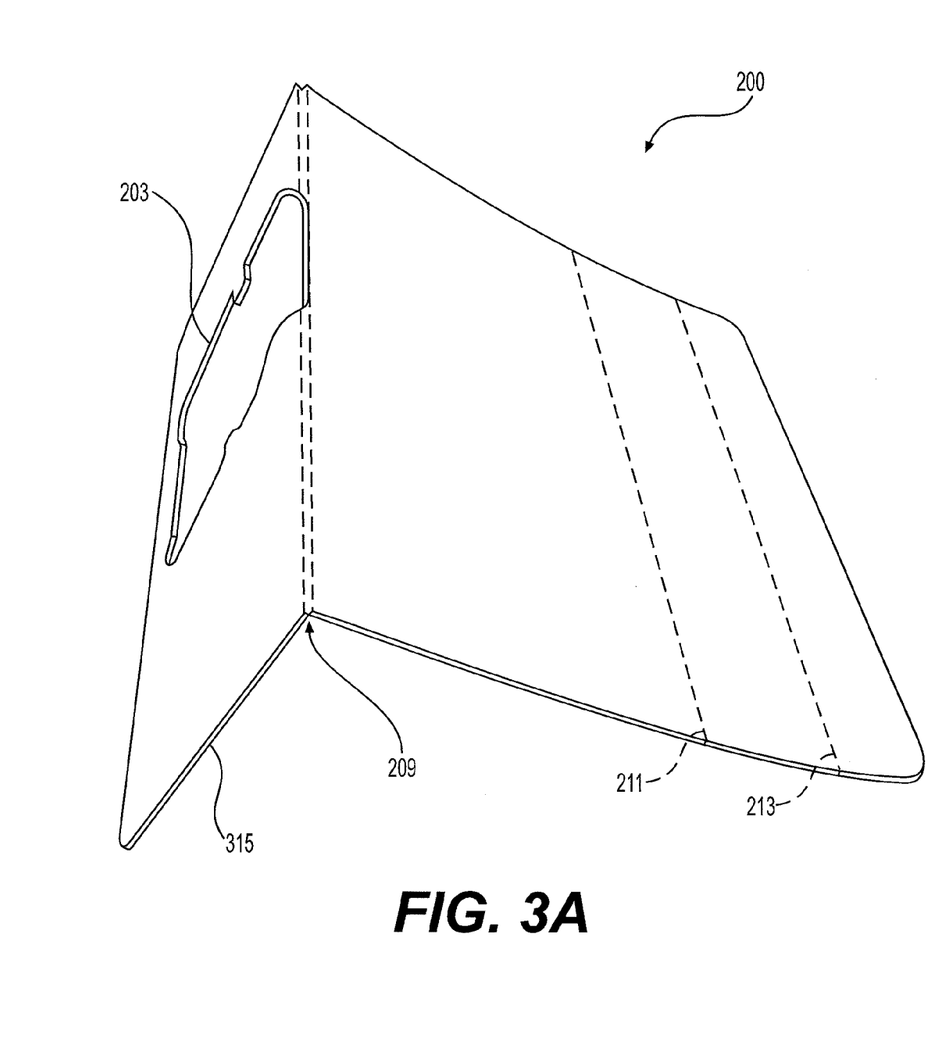
FIGS. 3A-3C are perspective views of the ID-1 Format data carrier of FIG. 2A at different stages of the conversion to a cradle for supporting an electronic mobile device.
Figure 3B:
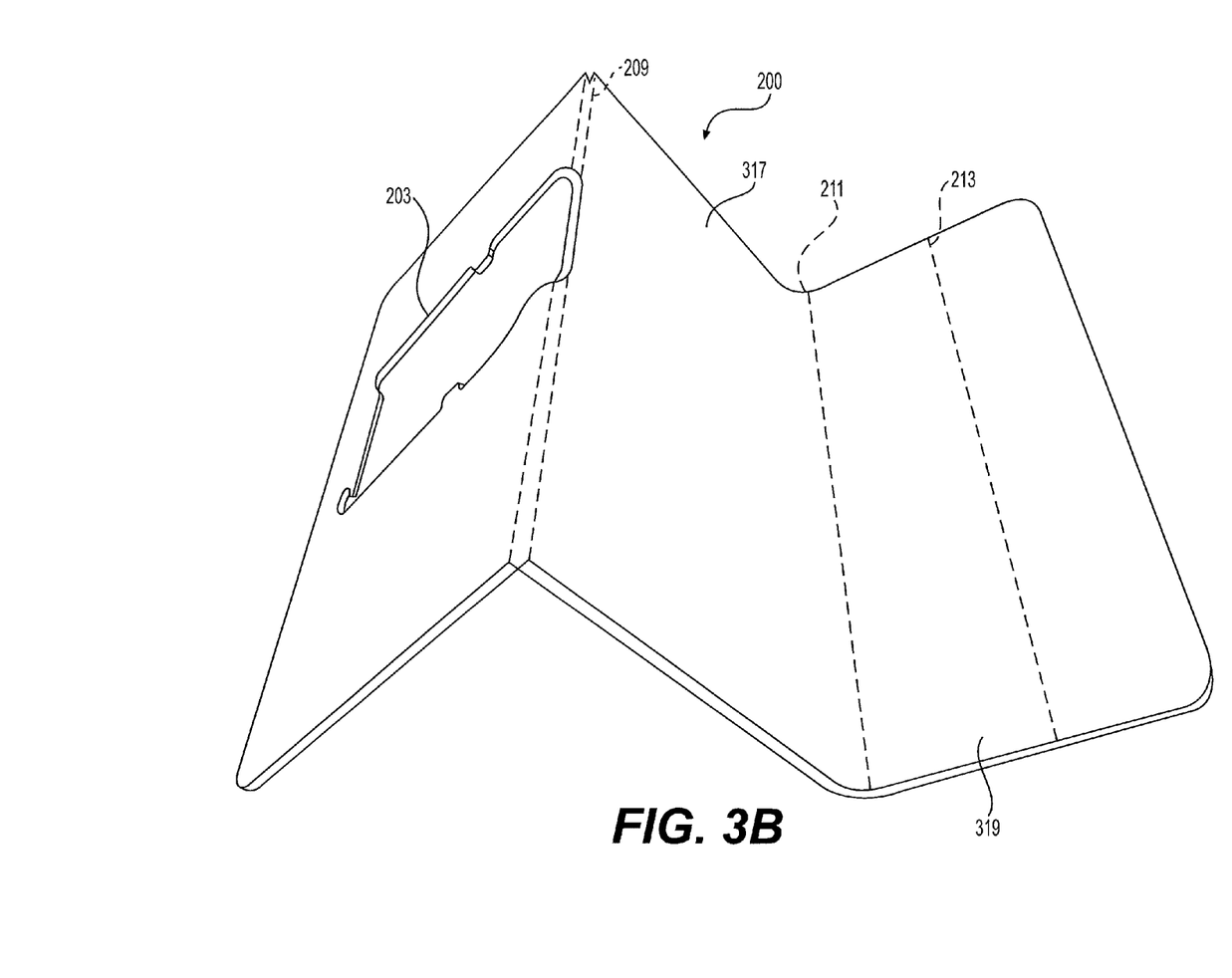
Figure 3C:
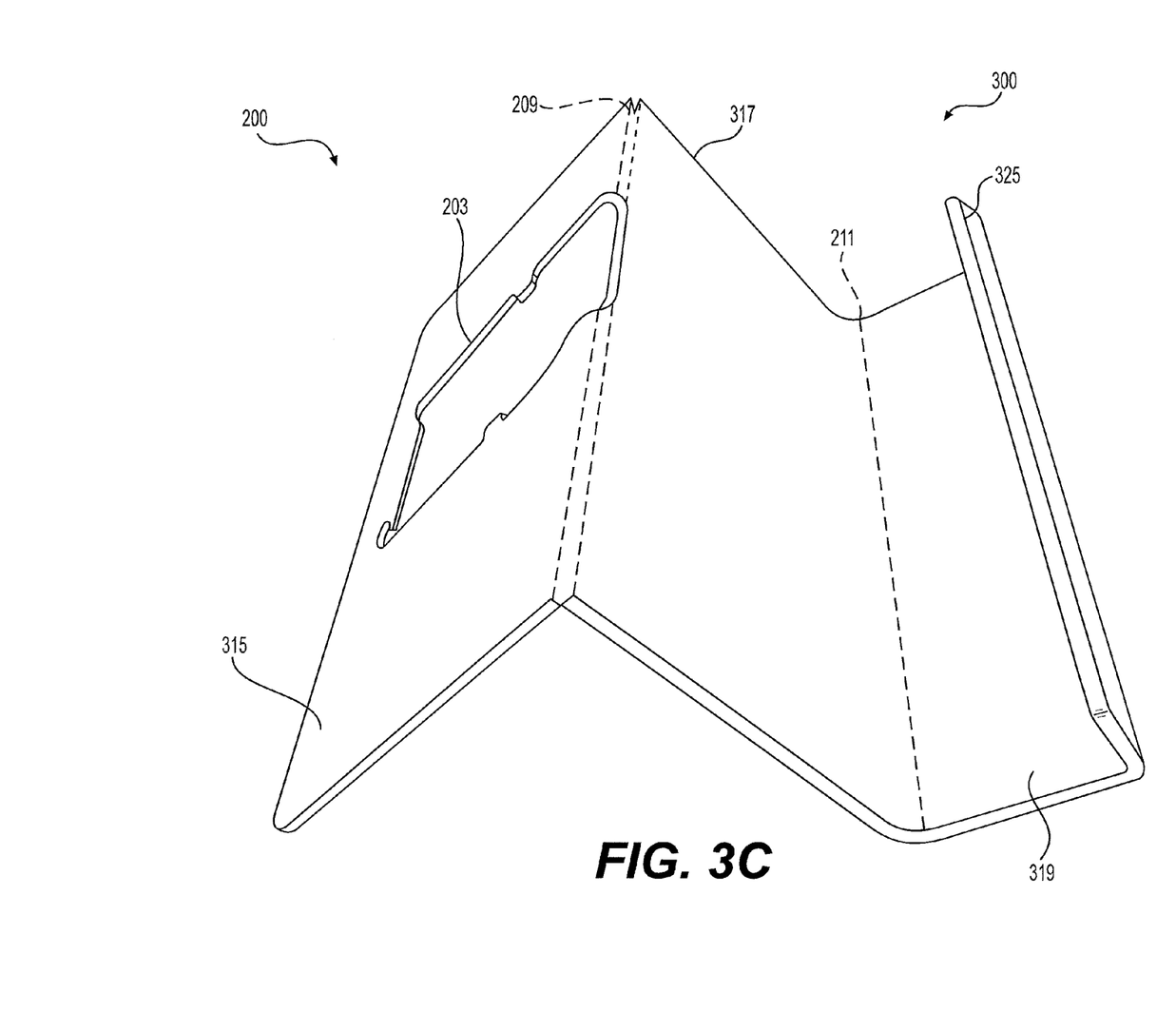

FIGS. 3A-3C show an exemplary embodiment of card body 200 at different stages of the conversion to a cradle for supporting an mobile communications device. FIG. 3A shows card body manipulated (e.g., bent) about perforation 209 to form a stand portion 315 that may be used to form an integral stand for card body 200 when used as a cradle. FIG. 3B shows card body 200 manipulated about perforation 211 to form a first support portion 317 that may be configured to support a rear surface of a mobile communication device opposite its display. In addition, manipulating card body 200 about perforation 211 also may form a second support portion 319 that may be configured to support a side surface of the mobile communication device such that its display can be easily viewed when disposed in the completed cradle. In an exemplary embodiment, perforations 209, 211 may be arranged such that stand portion 315 and first support portion 317 are substantially the same size.

FIG. 3C shows card body 200 manipulated about perforation 213 to form a lip portion 325 and to transform card body 200 into cradle 300. The mobile communications device may be held within cradle 300 between first support portion 317 and lip portion 325. In an exemplary embodiment, a distance between perforations 209, 211 is greater than a depth of the mobile communication device such that a side of the mobile communication device may easily rest on second support portion 319 and fit between first support portion 317 and lip portion 325 within cradle 300. In such an embodiment, a length lip portion 325 is shorter than a length of second support portion 319 such that a display of the mobile communication device disposed within cradle 300 is not significantly obstructed by lip portion 325 to facilitate viewing of the display.

Figure 4A:
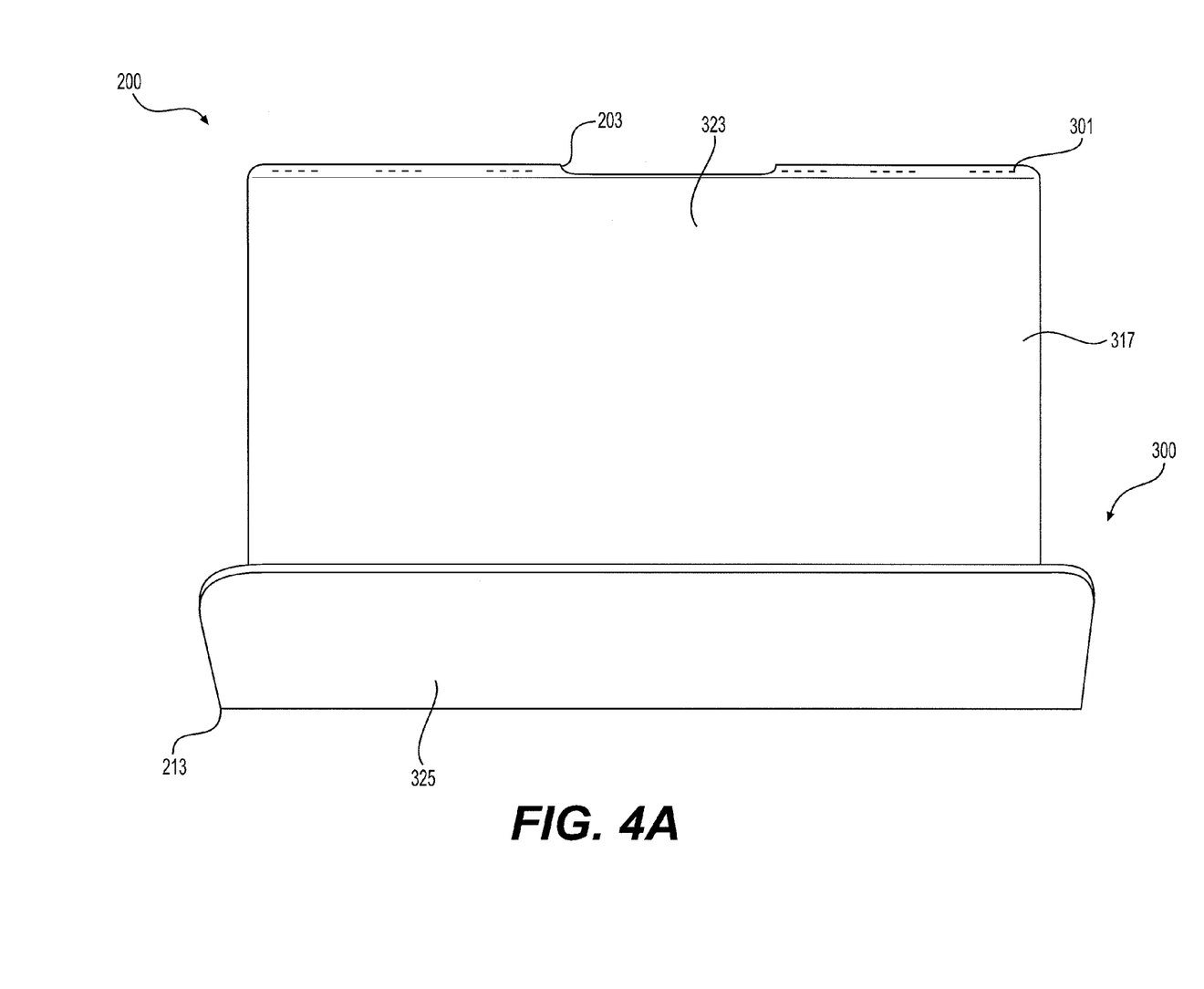
FIG. 4A is a front elevational view of the ID-1 Format data carrier of FIG. 2A converted into a cradle for supporting an mobile communications device.
Figure 4B:
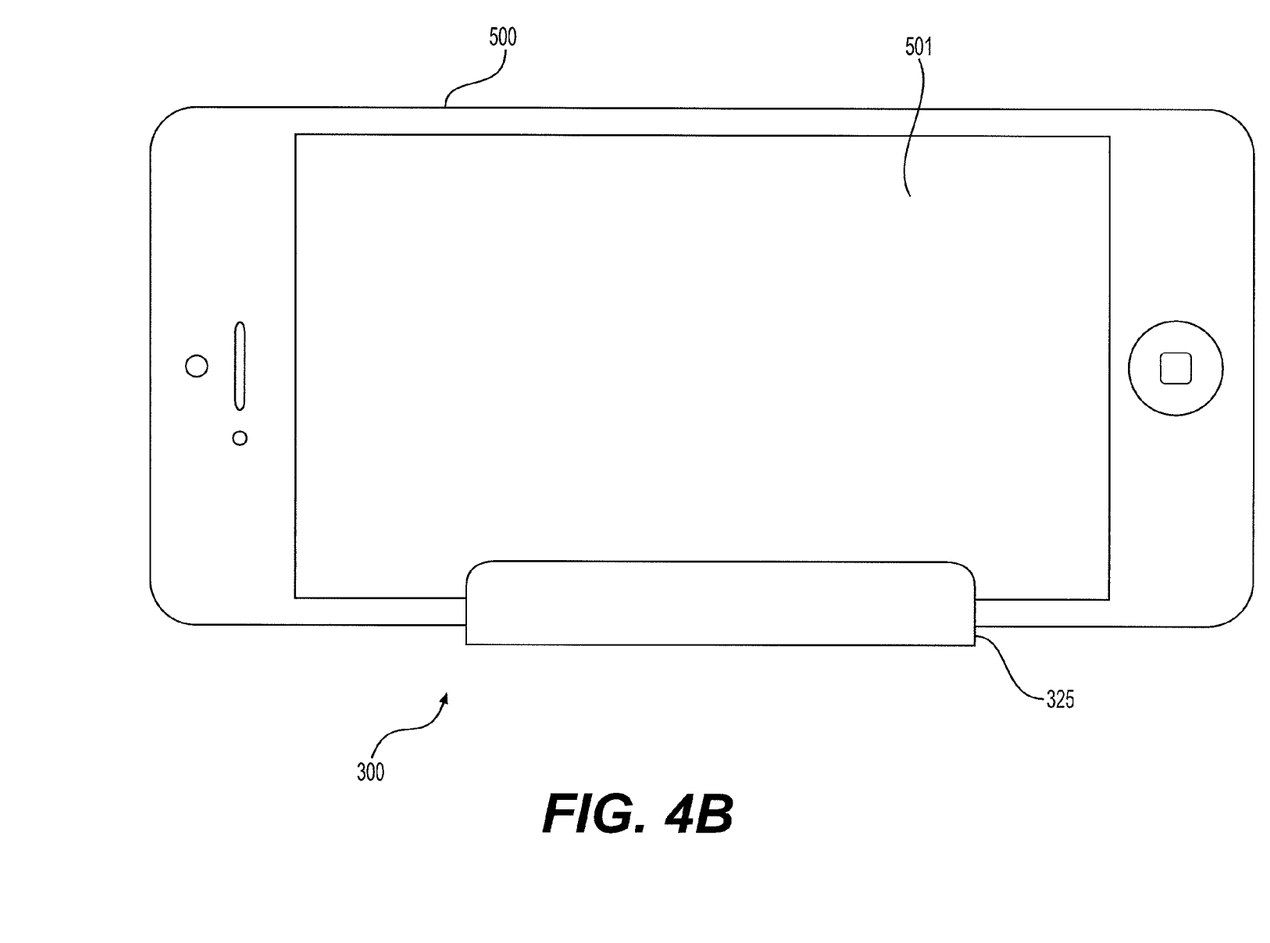
FIG. 4B is a front elevational view of the cradle of FIG. 4A supporting a mobile communications device.

FIG. 4A is a front elevational view of a cradle according to an exemplary embodiment of the invention that illustrates a height of lip portion 325 is less than a distance between perforations 209, 211, and significantly less than a height of first support portion 317. FIG. 4B shows mobile communications device 500 having a display 501 disposed within cradle 300. In the exemplary embodiment of FIGS. 4A and 4B, the illustrated configuration of cradle 300 facilitates viewing of display 501 when a back surface of the mobile communications device 500 is supported in cradle 300 between first support surface 317 and lip portion 325.

Figure 5:
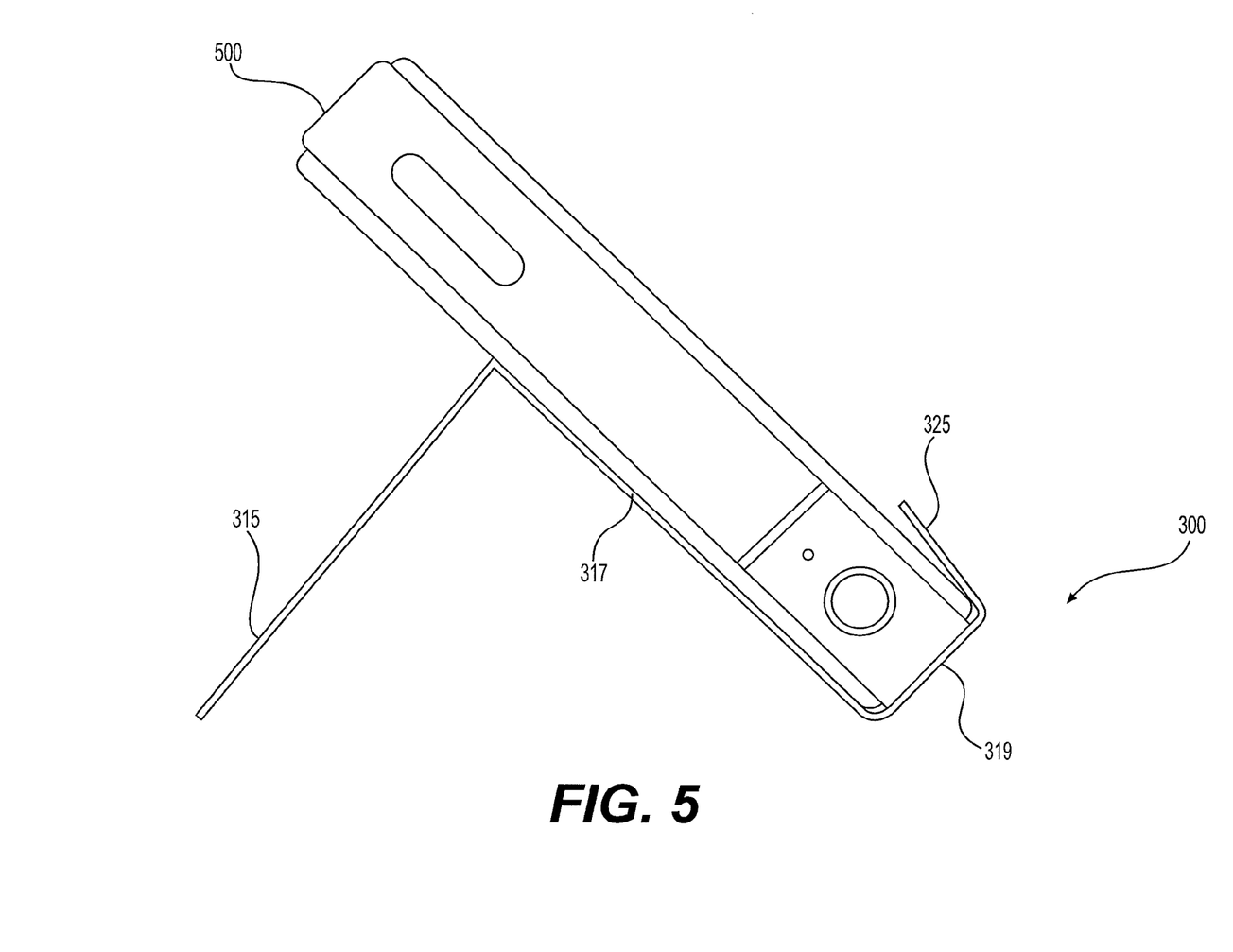
FIG. 5 is a side elevational view of the converted ID-1 Format data carrier of FIG. 4A supporting a mobile communications device.

FIG. 5 illustrates a side elevational view of mobile communications device 500 disposed within cradle 300. Mobile communications device 500 may be securely supported within cradle 300 by first and second surfaces 317, 319 and restricted by lip portion 325 that is configured to prevent mobile communications device 500 from sliding along the sloped surface of first support portion 317. In addition, stand portion 315 may be configured to support mobile communications device 501 in an inclined position to facilitate viewing of display 501. An angle between stand portion 315 and first support portion 317 may be adjusted according to a user's position to achieve optimal viewing of display 501, which is illustrated in a landscape orientation. Nevertheless, the angle between stand portion 315 and first support portion 317 should be no more than 90° to support the inclined mobile communications device 500 adequately and prevent stand portion 315 from returning to its original position aligned with first support portion 317. Similarly, the angle between stand portion 315 and first support portion 317 should be no less than 45° to prevent the weight of mobile communications device 500 from toppling and causing stand portion 315 to bend completely and come into contact with a back portion of first support portion 317. Likewise, another angle between first support portion and second support portion may be in a range from 90° to 135°, and yet another angle between the second support portion 319 and the lip portion 325 may be less than 120° or lip portion 325 may even be parallel to first support portion 317. These angles are exemplary and the invention is not limited to these specific arrangements.

As shown in FIG. 5, the size of second support portion 319 should be sufficient to permit mobile communications device 500 to fit within cradle 300 formed by first support portion 317, second support portion 319, and lip portion 325. Likewise, the positions of perforations 209, 211, 213 may be adjusted to accommodate a particular type of mobile communications device. In an example of card body 200, perforations 209, 211, 213 may be positioned to accommodate a Samsung Galaxy S5, Apple iPhone 6, or other similarly-sized device such that first support portion 317 may be 30 mm, second support portion 319 may be 13 mm, and lip portion 325 may be 10 mm.

While the invention has been described in connection with various example structures, configurations, and illustrative implementations, it will be understood by those skilled in the art that other variations and modifications of the structures, configurations, and implementations described above may be made without departing from the scope of the invention. For example, the scope of this application comprises all possible combinations of the various elements and features disclosed and incorporated by reference herein, and the particular elements and features presented in the claims and disclosed and incorporated by reference above may be combined with each other in other ways within the scope of this application, such that the application should be recognized as also directed to other implementations comprising other possible combinations. For example, while the disclosed embodiments illustrate the manipulation lines extending in a widthwise direction, such manipulation lines may be provided in a lengthwise direction as well so the screen of a mobile communications device can be viewed in a portrait orientation. Other structures, configurations, and implementations consistent with the scope of the claimed invention will be apparent to those skilled in the art from a consideration of the specification or practice of the invention disclosed herein. It is intended that the specification and the described examples are illustrative with the true scope of the invention being defined by the following claims.

What is claimed is:

1. A data carrier configured for conversion into a cradle configured to support a mobile communications device, the data carrier comprising:
    a card body comprising a first end and a second end along a particular direction and a first side and a second side along a further direction, the card body comprising:
        a cutout;
        a first manipulation line extending along the further direction at a further position of the card body at or beyond an end of the cutout opposite the first end, the first manipulation line defining a stand portion extending from the first end to the first manipulation line;
        a second manipulation line extending along the further direction of the card body downstream of the first manipulation line relative to the first end in the particular direction, the second manipulation line defining a first support portion extending from the first manipulation line to the second manipulation line;
        a third manipulation line extending along the further direction of the card body downstream of the second manipulation line relative to the first end in the particular direction, the third manipulation line defining a second support portion extending from the second manipulation line to the third manipulation line such that a length of the second support portion is less than a length of the first support portion; and
        a lip portion defined by the third manipulation line and the second end, a length of the lip portion is less than the length of the second support portion; and
    a removable SIM card disposed within the cutout, the removable SIM card connected to the card body by at least one fixing portion,
    wherein the card body is configured to be manipulated about the first manipulation line so that the stand portion forms a stand such that an end of the stand portion proximate the first manipulation line is elevated relative to the first end of the card body,
    wherein the card body is configured to be manipulated about the second manipulation line so that the first support portion is configured to support a rear surface of the mobile communications device and the second support portion is configured to support a side surface of the mobile communications device, and
    wherein the card body is configured to be manipulated about the third manipulation line so that the lip portion is configured to secure the mobile communications device within the cradle formed by the first support portion, the second support portion, and the lip portion.

2. The data carrier according to claim 1, wherein the stand portion, first support portion, the second support portion, and the lip portion are substantially the same width.

3. The data carrier according to claim 1, wherein a size of the card body is the ID-1 format.

4. The data carrier according to claim 1, wherein a size of the SIM card is one of a micro-SIM (3FF) format and a nano-sim (4FF) format.

5. The data carrier according to claim 4, wherein the first manipulation line is substantially aligned with an end of the cutout closer to the second end of the card body along the further direction.

6. The data carrier according to claim 5, wherein a length of the stand portion is substantially same as the length of the first support portion.

7. The data carrier according to claim 1, wherein the first manipulation line is configured to be manipulated to form an angle in a range from 45 degrees to 90 degrees between the stand portion and the first support portion.

8. The data carrier according to claim 7, wherein the second manipulation line is configured to be manipulated to form an angle in a range from 90 degrees to 135 degrees between the first support portion and the second support portion.

9. The data carrier according to claim 8, wherein the third manipulation line is configured to be manipulated to form an angle of no more than 120 degrees between the second support portion and the lip portion.

10. A method of forming a cradle for supporting a mobile communications device from a data carrier comprising a card body, the method comprising:
providing the card body comprising a first end and a second end along a particular direction and a first side and a second side along a further direction, the card body comprising:
a cutout;
a first manipulation line extending along the further direction at a particular position of the card body at or beyond an end of the cutout opposite the first end, the first manipulation line defining a stand portion extending from the first end to the first manipulation line;
a second manipulation line extending along the further direction of the card body downstream of the first manipulation line relative to the first end in the particular direction, the second manipulation line defining a first support portion extending from the first manipulation line to the second manipulation line;
a third manipulation line extending along the further direction of the card body downstream of the second manipulation line relative to the first end in the particular direction, the third manipulation line defining a second support portion extending from the second manipulation line to the third manipulation line such that a length of the second support portion is less than a length of the first support portion; and
a lip portion defined by the third manipulation line and the second end, a length of the lip portion is less than the length of the second support portion;
manipulating the card body about the first manipulation line to form a stand with the stand portion wherein an end of the stand portion proximate the first manipulation line is elevated relative to the first end of the card body;
manipulating the card body about the second manipulation line so that the first support portion is configured to support a rear surface of the mobile communications device and the second support portion is configured to support a side surface of the mobile communications device, and
manipulating the card body about the third manipulation line so that the lip portion is configured to secure the mobile communications device within the cradle formed by the first support portion, the second support portion, and the lip portion.

11. The method of claim 10, wherein the data carrier further comprises a removable SIM card disposed within the cutout of the card body, the removable SIM card connected to the card body by at least one fixing portion.

12. The method of claim 10, further comprising:
removing the removable SIM card from the card body by breaking the at least one fixing portion,
wherein the removing step is performed before performing the steps of manipulating the card body about the first, second, and, third manipulation line.

13. The method of claim 12, wherein a size of the card body is the ID-1 format.

14. The method of claim 13, wherein a size of the SIM card is one of a micro-SIM (3FF) format and a nano-sim (4FF) format.

15. The method of claim 12, wherein the first manipulation line is substantially aligned with an end of the cutout closer to the second end of the card body along the further direction.

16. The method of claim 15, wherein a length of the stand portion is substantially same as the length of the first support portion.

17. The method of claim 10, wherein the card body is manipulated about the first manipulation line to form an angle in a range from 45 degrees to 90 degrees between the stand portion and the first support portion.

18. The method of claim 17, wherein the card body is manipulated about the second manipulation line to form an angle in a range from 90 degrees to 135 degrees between the first support portion and the second support portion.

19. The method of claim 18, wherein the card body is manipulated about the third manipulation line to form an angle of no more than 120 degrees between the second support portion and the lip portion.

* * * * *